US008899585B2

(12) United States Patent
Tokue et al.

(10) Patent No.: US 8,899,585 B2

(45) Date of Patent: Dec. 2, 2014

(54) LOTTERY GAME APPARATUS

(71) Applicant: NAMCO BANDAI Games, Inc., Tokyo (JP)

(72) Inventors: Akihiko Tokue, Samukawa-machi (JP); Tetsuo Tokitou, Sagamihara (JP); Yoshinori Sato, Zama (JP)

(73) Assignee: BANDAI NAMCO Games Inc., Tokyo (JP)

( * ) Notice: Subject to any disclaimer, the term of this patent is extended or adjusted under 35 U.S.C. 154(b) by 105 days.

(21) Appl. No.: 13/848,911

(22) Filed: Mar. 22, 2013

(65) Prior Publication Data

US 2013/0341862 A1 Dec. 26, 2013

(30) Foreign Application Priority Data

Jun. 20, 2012 (JP) ................................ 2012-139063

(51) Int. Cl.

| | |
|---|---|
| ***A63F 7/28*** | (2006.01) |
| ***A63F 13/00*** | (2014.01) |
| ***A63F 9/00*** | (2006.01) |
| ***A63F 3/06*** | (2006.01) |
| ***G07F 17/32*** | (2006.01) |
| ***G07F 17/38*** | (2006.01) |
| *A63F 7/34* | (2006.01) |

(52) U.S. Cl.

CPC .......... *A63F 3/0605* (2013.01); *G07F 17/3216* (2013.01); *G07F 17/329* (2013.01); *G07F 17/38* (2013.01); *A63F 2007/346* (2013.01)

USPC ................. 273/138.3; 273/138.4; 273/144 A; 273/144 B; 273/440; 273/445; 273/454; 463/7; 463/16; 463/25

(58) Field of Classification Search

USPC ............ 273/138.3, 138.4, 144 A, 144 B, 440, 273/445, 454, 138.1, 138.2; 463/7, 16, 25

See application file for complete search history.

(56) References Cited

U.S. PATENT DOCUMENTS

| | | | | |
|---|---|---|---|---|
| 1,037,877 A * | 9/1912 | Doerr | ........................... | 273/397 |
| 4,039,193 A * | 8/1977 | Slater et al. | ................ | 273/138.4 |

(Continued)

FOREIGN PATENT DOCUMENTS

| | | |
|---|---|---|
| EP | 1 547 656 A1 | 6/2005 |
| EP | 1 990 074 A1 | 11/2008 |

(Continued)

OTHER PUBLICATIONS

Search Report dated Sep. 17, 2013 in the corresponding GB application No. 1305269.1.

*Primary Examiner* — Benjamin Layno

(74) *Attorney, Agent, or Firm* — Posz Law Group, PLC

(57) ABSTRACT

A lottery game apparatus includes a distribution section (discharge section) that discharges a ball that has been discharged in response to an operation input performed using an operation section, a plurality of open areas that receive the ball that has fallen from the distribution section, a plurality of lottery sections that implement a lottery using the ball, a moving path that guides the ball that has fallen into a first open area to a first lottery section, a moving path that guides the ball that has fallen into a second open area to a second lottery section, and a moving path that guides the ball that has fallen into a third open area to a third lottery section. The distribution section changes the discharge position or the discharge direction of the ball.

18 Claims, 10 Drawing Sheets

(56) References Cited

U.S. PATENT DOCUMENTS

| | | | | |
|---|---|---|---|---|
| 4,061,334 | A * | 12/1977 | Kanno | 273/126 A |
| 4,662,636 | A * | 5/1987 | Crompton | 273/138.2 |
| 5,044,639 | A | 9/1991 | Egging et al. | |
| 5,275,402 | A * | 1/1994 | Malavazos et al. | 273/138.2 |
| 5,297,816 | A * | 3/1994 | Becchio | 273/459 |
| 5,622,366 | A * | 4/1997 | Inoue | 273/138.2 |
| 5,697,611 | A | 12/1997 | Kelly et al. | |
| 5,752,699 | A * | 5/1998 | Crompton et al. | 273/138.2 |
| 5,967,515 | A * | 10/1999 | Halliburton | 273/138.2 |
| 6,264,197 | B1 * | 7/2001 | Halliburton | 273/138.2 |
| 2003/0073479 | A1 * | 4/2003 | Wilson et al. | 463/16 |
| 2007/0057451 | A1 | 3/2007 | Halliburton | |
| 2008/0280661 | A1 | 11/2008 | Shoemaker, Jr. | |

FOREIGN PATENT DOCUMENTS

| | | | |
|---|---|---|---|
| GB | 2469174 | A | 10/2010 |
| JP | 2002-210224 | A | 7/2002 |
| JP | 2003-135838 | A | 5/2003 |
| JP | 2004-113566 | A | 4/2004 |
| JP | 2009-136317 | A | 6/2009 |
| WO | 02/07836 | A1 | 1/2002 |
| WO | 2005/046814 | A2 | 5/2005 |

* cited by examiner

LOTTERY GAME APPARATUS

Japanese Patent Application No. 2012-139063 filed on Jun. 20, 2012, is hereby incorporated by reference in its entirety.

BACKGROUND OF THE INVENTION

The present invention relates to a lottery game apparatus that includes a lottery section that implements a lottery using a game medium.

A token game machine has been known that includes a lottery mechanism by which a ball discharged when a token has entered a chucker is moved to a lottery section through a predetermined moving path (see JP-A-2004-113566, for example).

The above token game machine is configured so that the ball discharged when a token has entered a chucker is moved to a single lottery section, and the player cannot select a desired lottery section by operating an operation section.

SUMMARY

The invention may provide a lottery game apparatus that can implement a game in which a lottery section used for a lottery changes in response to an operation input performed by the player.

According to one aspect of the invention, there is provided a lottery game apparatus that includes a first lottery section and a second lottery section that implement a lottery using a game medium, the lottery game apparatus including:

a discharge section that discharges the game medium based on an operation input performed by a player;

a first open area and a second open area that are provided under the discharge section, and receive the game medium that has fallen from the discharge section;

a first moving path that guides the game medium from the first open area to the first lottery section; and a second moving path that guides the game medium from the second open area to the second lottery section, the discharge section changing a discharge position or a discharge direction of the game medium.

Figure 1:
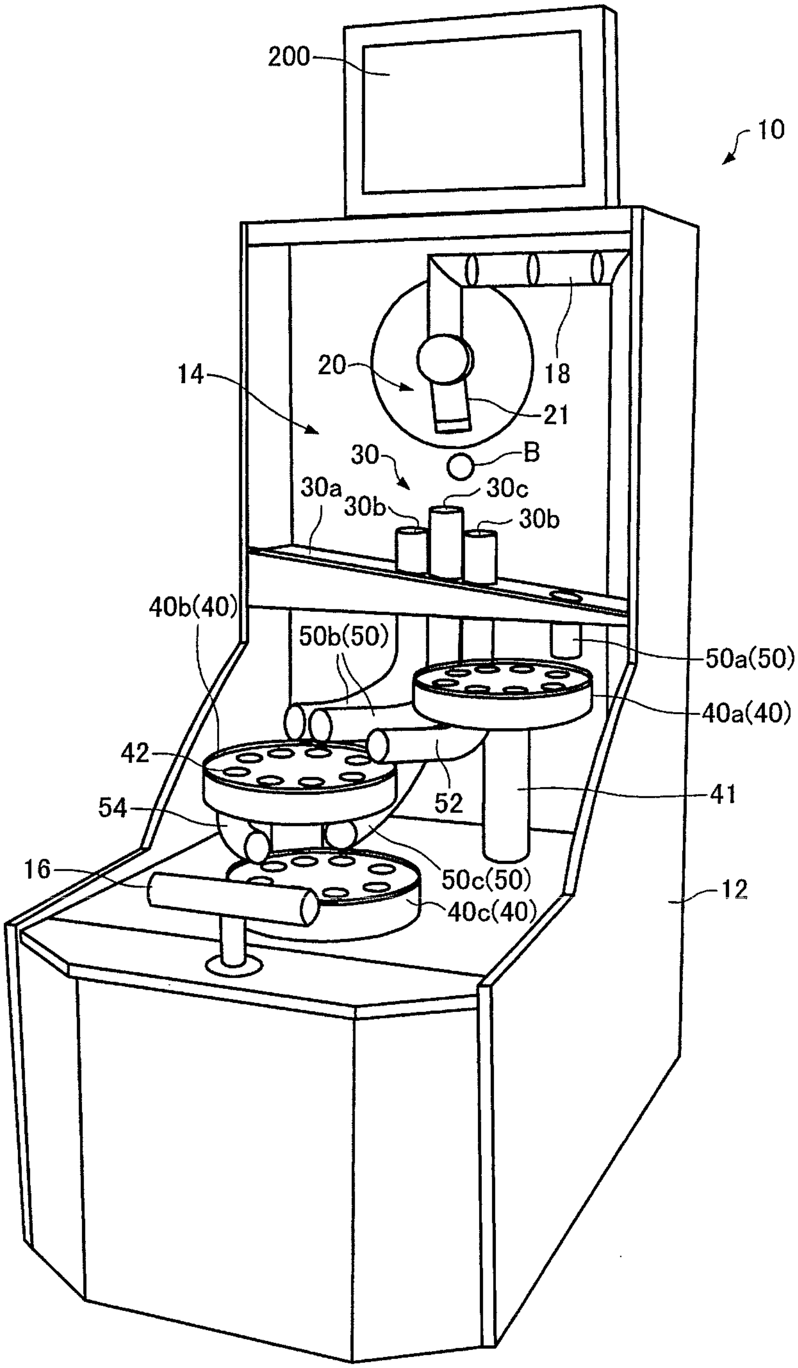
FIG. 1 is a perspective view illustrating an example of the external appearance of a game apparatus according to one embodiment of the invention.

DETAILED DESCRIPTION OF THE EMBODIMENT (1) According to one embodiment of the invention, there is provided a lottery game apparatus that includes a first lottery section and a second lottery section that implement a lottery using a game medium, the lottery game apparatus including:

a discharge section that discharges the game medium based on an operation input performed by a player;

a first open area and a second open area that are provided under the discharge section, and receive the game medium that has fallen from the discharge section;

a first moving path that guides the game medium from the first open area to the first lottery section; and a second moving path that guides the game medium from the second open area to the second lottery section, the discharge section changing a discharge position or a discharge direction of the game medium.

The term "game medium" used herein refers to a game ball, a game token, and the like.

The lottery game apparatus is configured so that the game medium falls into the first open area or the second open area in response to an operation input performed by the player, the game medium that has fallen into the first open area being guided to the first lottery section, and the game medium that has fallen into the second open area being guided to the second lottery section. This makes it possible to implement a game in which the lottery section used for a lottery changes in response to an operation input performed by the player.

(2) In the lottery game apparatus, the discharge section may include: a discharge path section, the game medium to be discharged passing through the discharge path section; a driver section that periodically swings the discharge path section; and an ejection section that discharges the game medium toward the discharge path section, and the ejection section may discharge the game medium in response to an operation input performed by the player.

According to the above configuration, the game medium is discharged in response to an operation input performed by the player, and the discharged game medium passes through the discharge path section that periodically swings, and falls into the first open area or the second open area, the game medium that has fallen into the first open area being guided to the first lottery section, and the game medium that has fallen into the second open area being guided to the second lottery section. This allows the player to enjoy the game by operating an operation section to discharge the game medium at an appropriate timing corresponding to the operation of the discharge path section so that a lottery is executed using the desired lottery section (first lottery section or second lottery section).

(3) In the lottery game apparatus, the discharge section may include: a discharge path section, the game medium to be discharged passing through the discharge path section; a driver section that periodically swings the discharge path section; and an ejection section that discharges the game medium toward the discharge path section, the driver section may stop the swing of the discharge path section, and the ejection section may discharge the game medium in response to an operation input performed by the player.

According to the above configuration, the discharge path section that periodically swings is stopped, and the game medium is discharged in response to an operation input performed by the player, and the discharged game medium passes through the discharge path section, and falls into the first open area or the second open area, the game medium that has fallen into the first open area being guided to the first lottery section, and the game medium that has fallen into the second open area being guided to the second lottery section. This allows the player to enjoy the game by operating an operation section to stop the discharge path section at an appropriate timing so that a lottery is executed using the desired lottery section (first lottery section or second lottery section).

(4) In the lottery game apparatus, the discharge section may include: a discharge path section, the game medium to be discharged passing through the discharge path section; a driver section that operates the discharge path section so that the game medium that moves along the discharge path section falls from the discharge path section; and an ejection section that discharges the game medium toward the discharge path section, and the driver section may operate the discharge path section in response to an operation input performed by the player to drop the game medium from the discharge path section.

According to the above configuration, the game medium that moves along the discharge path section falls into the first open area or the second open area when the discharge path section has been operated in response to an operation input performed by the player, the game medium that has fallen into the first open area being guided to the first lottery section, and the game medium that has fallen into the second open area being guided to the second lottery section. This allows the player to enjoy the game by operating an operation section to operate the discharge path section at an appropriate timing so that a lottery is executed using the desired lottery section (first lottery section or second lottery section).

(5) The lottery game apparatus may further include a third moving path that guides the game medium that has entered at least one lottery hole among a plurality of lottery holes formed in the first lottery section to the second lottery section.

According to the above configuration, when the game medium that has been guided to the first lottery section has entered a predetermined lottery hole, the game medium is guided to the second lottery section, and a lottery is executed again. It is possible to improve game playability by thus utilizing the movement of the game medium.

(6) In the lottery game apparatus, the first open area and the second open area may differ in area.

According to the above configuration, the difficulty level for the player to cause the game medium to fall into the first open area and the difficulty level for the player to cause the game medium to fall into the second open area differ from each other (i.e., the difficulty level for the player to move the game medium to the first lottery section and the difficulty level for the player to move the game medium to the second lottery section differ from each other) as a result of forming the first open area and the second open area to have a different area.

(7) In the lottery game apparatus, an area, a position, or a shape of at least one of the first open area and the second open area may be changed.

According to the above configuration, the difficulty level for the player to cause the game medium to fall into the first open area (i.e., the difficulty level for the player to move the game medium to the first lottery section) can be changed by changing the area, the position, or the shape of the first open area, and the difficulty level for the player to cause the game medium to fall into the second open area (i.e., the difficulty level for the player to move the game medium to the second lottery section) can be changed by changing the area, the position, or the shape of the second open area.

(8) In the lottery game apparatus, at least one of a speed and a moving amount of an operation of the discharge path section that periodically swings may be changed.

According to the above configuration, the difficulty level for the player to cause the game medium to fall into the desired open area (i.e., the difficulty level for the player to move the game medium to the desired lottery section) can be changed by changing the speed or the moving amount of an operation of the discharge path section.

Exemplary embodiments of the invention are described below. Note that the following exemplary embodiments do not unduly limit the scope of the invention as stated in the claims. Note also that all of the elements described in connection with the following exemplary embodiments should not necessarily be taken as essential elements of the invention.

1. Configuration 1-1. Configuration of Game Apparatus

FIG. 1 is a perspective view illustrating an example of the external appearance of a game apparatus (lottery game apparatus) 10 according to one embodiment of the invention.

The game apparatus 10 according to one embodiment of the invention is configured to implement a lottery using a game medium discharged into a game space. The game apparatus 10 is configured so that the game starts when a coin (money) or a game value (e.g., token or ticket) has been inserted into the game apparatus 10. The game apparatus 10 may be configured to give the game value to the player corresponding to the game result (lottery result).

The game apparatus 10 includes a housing 12, an operation section 16, a distribution section 20, an open area 30, a lottery section 40, a moving path 50, and a display section 200.

The side of the upper part of the housing 12 is formed using a transparent plate (e.g., acrylic plate) (not illustrated in FIG. 1), and a game space 14 is formed inside the housing 12. The player plays a lottery game by pressing the operation section 16 implemented by a lever to discharge a ball B (an example of the game medium) into the game space 14. A token insertion slot (not illustrated in FIG. 1) is provided to the side of the lower part of the housing 12, and a processing section (computer) is provided inside the lower part of the housing 12.

The display section 200 is provided on the upper side of the housing 12, and displays a game image.

The distribution section 20 (or the discharge section) is a mechanism that drops (discharges) the ball B discharged into the game space 14 into (or onto) one open area among a plurality of open areas 30*a*, 30*b*, and 30*c* that are provided under the distribution section 20. The distribution section 20 includes a swing pipe 21 (an example of the discharge path section) that operates so that the position at which the ball B is dropped changes periodically. The distribution section 20 is provided in the upper part of the game space 14, and is connected to a moving path 18. The moving path 18 is a pipe that guides the ball B to the distribution section 20, the ball B being discharged from an ejection section provided in the lower part of the housing 12 in response to an operation performed using the operation section 16.

The open area 30 is provided under the distribution section 20. The open area 30*a* is formed by a slope and a circular opening (i.e., the upper opening of a moving path 50*a*) that is provided in the lower area of the slope, and is configured so that the ball B that has fallen onto the slope rolls down along the slope and enters the circular opening. The open areas 30*b* are formed by two circular openings (i.e., the upper opening of a moving path 50*b*), and the open area 30*c* is formed by one circular opening (i.e., the upper opening of a moving path 50*c*).

The moving path 50 (first moving path or second moving path) is a pipe that guides the ball B that has fallen into (or onto) the open area 30 to the lottery section 40. The moving path 50*a* guides the ball B that has fallen into (or onto) the open area 30*a* to a first lottery section 40*a*, the moving path 50*b* guides the ball B that has fallen into the open area 30*b* to a second lottery section 40*b*, and the moving path 50*c* guides the ball B that has fallen into the open area 30*c* to a third lottery section 40*c*. The moving paths 50*b* are formed by two pipes, and the moving path 50*a* and the moving path 50*c* are respectively formed by one pipe.

The lottery section 40 is a disk for implementing a lottery using the ball B. A plurality of lottery sections 40 are provided between the open area 30 and the bottom of the game space 14. The first lottery section 40*a* is provided at a position higher than the second lottery section 40*b*, and the third lottery section 40*c* is provided at a position lower than the second lottery section 40*b*. Each lottery section 40 is supported by a columnar support member 41, and continuously rotates around the center axis of the support member 41.

A plurality of lottery holes 42 are formed in the upper side of each lottery section 40 at equal intervals. The ball B that has reached the lottery section 40 through the moving path 50 enters one of the plurality of lottery holes 42. A sensor that detects the ball B that has entered the lottery hole 42 is provided in each lottery section 40. When the ball B has entered the lottery hole 42, points corresponding to the lottery hole 42 that has received the ball B are calculated, and the calculated points are displayed on the display section 200. The game value may be given to the player corresponding to the calculated points.

The ball B that has entered a predetermined lottery hole 42 among the plurality of lottery holes 42 formed in the first lottery section 40*a* passes through the first lottery section 40*a* in the vertical direction, and is guided to the second lottery section 40*b* along a moving path 52 (third moving path). Likewise, the ball B that has entered a predetermined lottery hole 42 among the plurality of lottery holes 42 formed in the second lottery section 40*b* passes through the second lottery section 40*b* in the vertical direction, and is guided to the third lottery section 40*c* along a moving path 54 (third moving path). Therefore, when the ball B has reached the first lottery section 40*a* and entered the predetermined lottery hole 42, the ball B moves to the second lottery section 40*b*, and the second lottery is executed. When the ball B has reached the second lottery section 40*b* and entered the predetermined lottery hole 42, the ball B moves to the third lottery section 40*c*, and the third lottery is executed. Note that the ball B that has entered a lottery hole 42 other than the predetermined lottery hole 42 passes through a passage (not illustrated in FIG. 1) provided inside the support member 41, and is collected inside the housing 12.

1-2. Configuration of Distribution Section

Figure 2A:
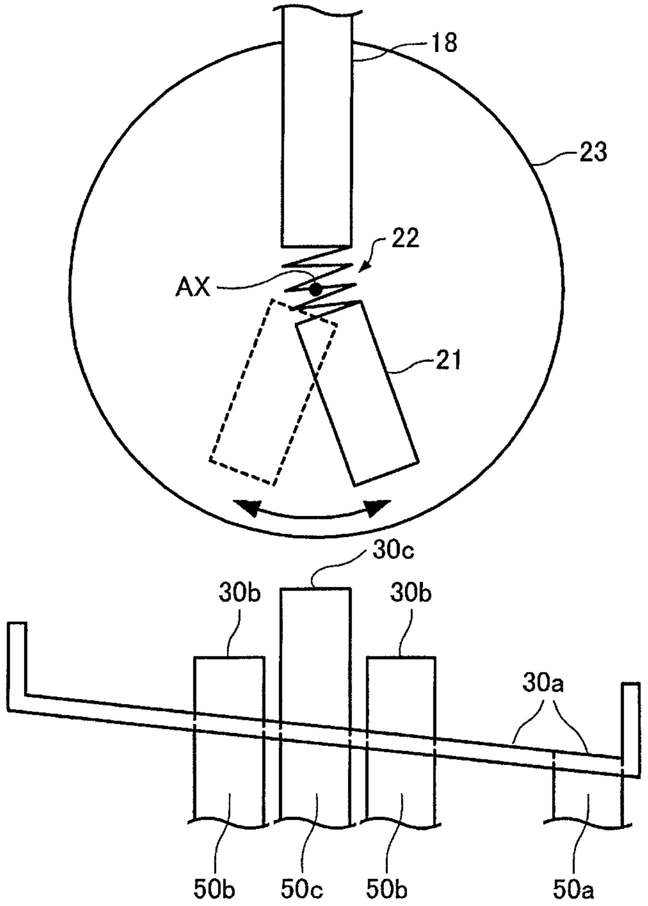
FIGS. 2A and 2B illustrate a detailed configuration of a distribution section.

FIG. 2A is a side view illustrating a detailed configuration of the distribution section 20. As illustrated in FIG. 2A, the distribution section 20 includes the swing pipe 21, a coil spring 22, and a rotary disk 23.

The coil spring (spring) 22 connects the moving path 18 and the swing pipe 21, and guides the ball B that has passed through the moving path 18 to the swing pipe 21. The upper end of the coil spring 22 is secured on the lower end of the moving path 18, and the lower end of the coil spring 22 is secured on the upper end of the swing pipe 21.

The rotary disk 23 is driven by a driver section so that the rotary disk 23 periodically rotates (swings) around an axis AX (center axis) at a constant angular velocity within a predetermined angular range. The lower end of the swing pipe 21 is secured on the rotary disk 23. The swing pipe 21 periodically rotates around the axis AX within a predetermined angular range in synchronization with the rotation of the rotary disk 23. The ball B that has been discharged into the game space 14 falls into (or onto) one open area among the open areas 30*a*, 30*b*, and 30*c* corresponding to the rotation angle of the swing pipe 21 when the ball B reached the swing pipe 21. Specifically, the swing pipe 21 operates to change the discharge position and the discharge direction of the ball B.

The player enjoys the game by discharging the ball B using the operation section 16 at an appropriate timing while observing the swing pipe 21 that periodically rotates so that the ball B falls into (or onto) the desired open area among the open areas 30*a*, 30*b*, and 30*c* (i.e., so that the ball B moves to the desired lottery section among the lottery sections 40*a*, 40*b*, and 40*c*). Specifically, the game apparatus according to one embodiment of the invention can implement a game in which the lottery section used for a lottery changes in response to an operation input performed by the player.

Figure 2B:
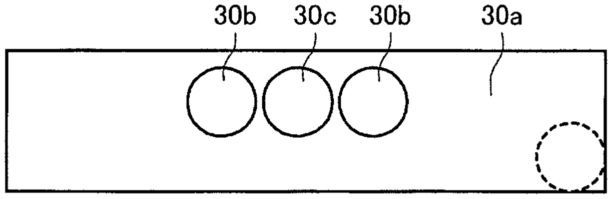

FIG. 2B is a top view illustrating the open area 30. As illustrated in FIGS. 2A and 2B, the open area 30*c* has the smallest area since the open area 30*c* is formed by the upper opening of the moving path 50*c* that is formed by one pipe. The total area of the open areas 30*b* is twice the area of the open area 30*c* since each open area 30*b* is formed by the upper opening of the moving path 50*b* that is formed by one pipe. The open area 30*a* has the largest area since the open area 30*a* is formed by the slope and the upper opening of the moving path 50*a*. Therefore, the difficulty level is highest when dropping the ball B into the open area 30*c* (i.e., when moving the ball B to the third lottery section 40*c*), and is lowest when dropping the ball B into (or onto) the open area 30*a* (i.e., when moving the ball B to the first lottery section 40*a*).

1-3. Configuration of Lottery Section

Figure 3:
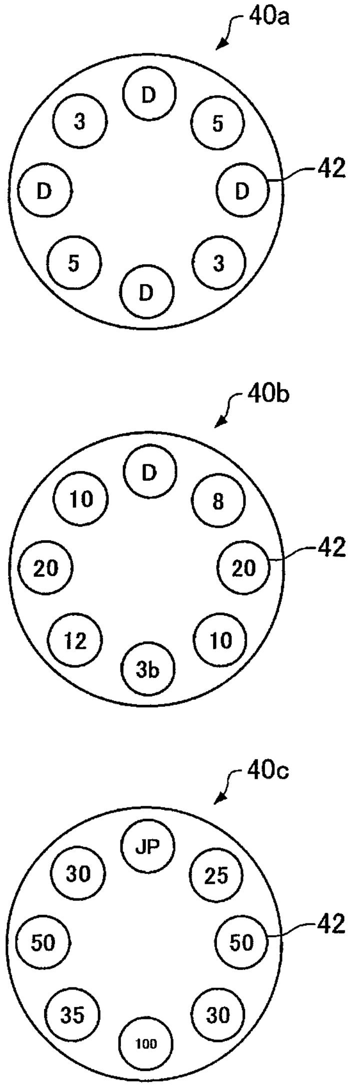
FIG. 3 is a top view illustrating an example of a lottery section.

FIG. 3 is a top view illustrating an example of the lottery section 40 (first lottery section 40*a*, second lottery section 40*b*, and third lottery section 40*c*). As illustrated in FIG. 3, eight lottery holes 42 are formed in each lottery section 40 at equal intervals in the circumferential direction.

In FIG. 3, the numeral assigned to each lottery hole 42 indicates points given to the player when the ball B has entered the lottery hole 42. For example, points are calculated to be "5" when the ball B has entered the lottery hole 42 of the first lottery section 40*a* to which a numeral "5" is assigned, and calculated to be "25" when the ball B has entered the lottery hole 42 of the third lottery section 40*c* to which a numeral "25" is assigned. As illustrated in FIG. 3, points are assigned (set) to each lottery hole 42 so that the player obtains a few points when the ball B has entered the lottery hole 42 of the first lottery section 40*a* to which it is easy to move the ball B (i.e., the difficulty level is low), and obtains a lot of points when the ball B has entered the lottery hole 42 of the third lottery section 40*c* to which it is difficult to move the ball B (i.e., the difficulty level is high). More specifically, the player can obtain only three or five points when the ball B has entered the lottery hole 42 of the first lottery section 40*a*, but can obtain twenty-five points or more when the ball B has entered the lottery hole 42 of the third lottery section 40*c*.

When the ball B has entered the lottery hole 42 of the second lottery section 40*b* to which a sign "3*b*" is assigned, three balls B are sequentially discharged into the game space 14 (distribution section 20). In this case, the player can play a lottery three times without inserting the game value and operating the operation section 16. When the ball B has entered the lottery hole 42 of the third lottery section 40*c* to which a sign "JP" is assigned, it is determined that the player has won a jackpot, and a predetermined jackpot process (e.g., a process that gives the entirety or part of the accumulated game value to the player) is performed.

When the ball B has entered the lottery hole 42 of the first lottery section 40*a* to which a sign "D" is assigned, the ball B moves to the second lottery section 40*b* through the moving path 52. In this case, the player can play a lottery that utilizes the second lottery section 40*b*. Likewise, when the ball B has entered the lottery hole 42 of the second lottery section 40*b* to which a sign "D" is assigned, the ball B moves to the third lottery section 40*c* through the moving path 54. In this case, the player can play a lottery that utilizes the third lottery section 40*c*.

Figure 4:
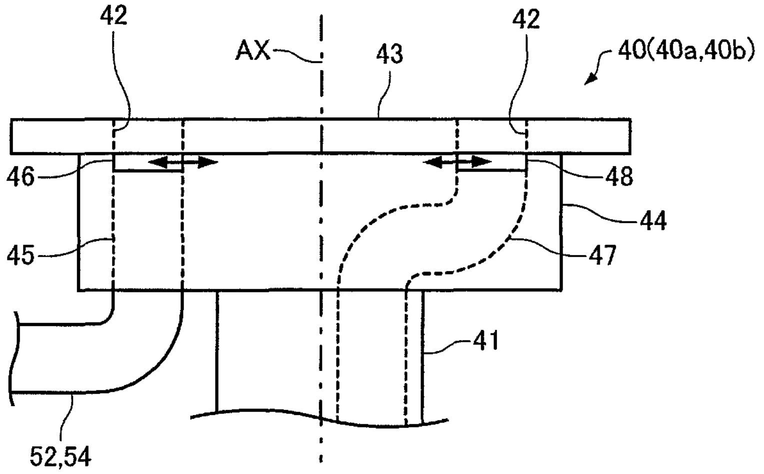
FIG. 4 is a side view illustrating a detailed configuration of a lottery section.

FIG. 4 is a side view illustrating a detailed configuration of the lottery section 40. The following description is given taking the configuration of the first lottery section 40*a* and the second lottery section 40*b* as an example.

As illustrated in FIG. 4, the lottery section 40 includes a lottery disk 43 and a base member 44, a plurality of lottery holes 42 being formed in the lottery disk 43. The lottery disk 43 continuously rotates on the base member 44 around a vertical axis AX, and the base member 44 is secured on the support member 41.

A passage 45 that guides the ball B that has entered the lottery hole 42 to the moving path 52 (or the moving path 54) is formed in the base member 44. A shutter 46 that opens and closes is provided to the upper opening of the passage 45. When it has been detected that the ball B has entered the lottery hole 42 of the lottery section 40 to which a sign "D" is assigned (see FIG. 3), the shutter 46 slides in the horizontal direction when the lottery hole 42 is positioned over the shutter 46 (i.e., over the upper opening of the passage 45), and allows the ball B to enter the moving path 52 (or the moving path 54) through the passage 45.

A passage 47 for collecting the ball B that has entered the lottery hole 42 is formed in the base member 44 and the support member 41. A shutter 48 that opens and closes is provided to the upper opening of the passage 47. When it has been detected that the ball B has entered the lottery hole 42 (e.g., the lottery hole 42 to which a numeral or a sign "3*b*" or "JP" is assigned (see FIG. 3)) of the lottery section 40 other than the lottery hole 42 to which a sign "D" is assigned, the shutter 48 slides in the horizontal direction when the lottery hole 42 is positioned over the shutter 48 (i.e., over the upper opening of the passage 47), and allows the ball B to be collected inside the housing 12 through the passage 47.

The third lottery section 40*c* is configured in the same manner as the first lottery section 40*a* and the second lottery section 40*b*, except that the third lottery section 40*c* does not have the passage 45 and the shutter 46.

1-4. Adjustment of Difficulty Level

The game apparatus 10 according to one embodiment of the invention is configured so that the area, the position, and the shape of each open area 30 can be changed. The difficulty level can be adjusted by changing the area, the position, and the shape of each open area 30.

Figure 5A:
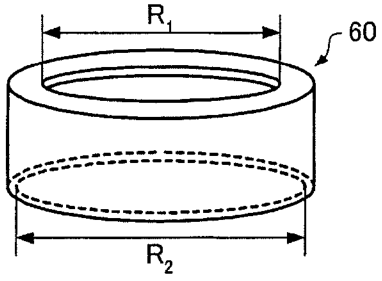
FIGS. 5A and 5B illustrate an example of an adjustment member for adjusting the area of an open area.

FIG. 5A illustrates an example of an adjustment member for adjusting the area of the open area 30. An adjustment member 60 illustrated in FIG. 5A is a pipe-shaped member that can be attached to the upper opening of the moving path 50*b* or 50*c* that forms the open area 30*b* or 30*c*. The diameter $R_1$ of the upper opening of the adjustment member 60 is larger than the diameter of the ball B and is smaller than the diameter (inner diameter) R of the upper opening of the moving paths 50*b* and 50*c*. The inner diameter $R_2$ of the adjustment member 60 is larger than the outer diameter of the moving paths 50*b* and 50*c*.

Figure 5B:
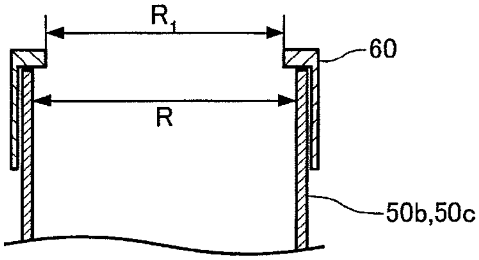

The diameter R of the upper opening (open area 30*b* or 30*c*) of the moving path 50*b* or 50*c* can be changed to the diameter $R_1$ that is smaller than the diameter R by attaching the adjustment member 60 to the upper part of the moving path 50*b* or 50*c* (see FIG. 5B). Specifically, the area of the open area 30*b* or 30*c* can be reduced by attaching the adjustment member 60. This makes it possible to easily increase (adjust) the difficulty level for the player to cause the ball B to fall into the open area 30*b* or 30*c* (i.e., the difficulty level for the player to move the ball B to the second lottery section 40*b* or the third lottery section 40*c*).

Figure 5C:
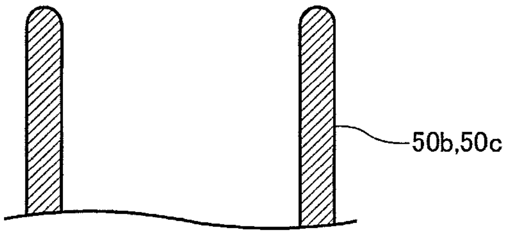
FIG. 5C illustrates an example in which the shape of the edge of the upper opening of a moving path is changed.

The difficulty level may be adjusted by employing a configuration in which the shape of the edge of the upper opening of the moving path 50*b* or 50*c* or the adjustment member 60 can be changed. In the example illustrated in FIG. 5C, the edge of the upper opening of the moving path 50*b* or 50*c* has a round shape. The difficulty level for the player to cause the ball B to fall into the open area 30*b* or 30*c* can be decreased by utilizing such a moving path 50*b* or 50*c*. Note that the difficulty level for the player to cause the ball B to fall into the open area 30*b* or 30*c* increases as the shape of the edge of the upper opening of the moving path 50*b* or 50*c* becomes sharper.

It is also possible to employ a configuration in which the shape of the open area 30*b* or 30*c* (i.e., the cross-sectional shape of the upper part of the moving path 50*b* or 50*c* or the adjustment member 60) can be changed (e.g., circular shape, rectangular shape, or polygonal shape). When the lottery medium has a spherical shape, the difficulty level for the player to cause the ball B to fall into the open area 30*b* or 30*c* can be increased by changing the shape of the open area 30*b* or 30*c* from a circular shape to a rectangular shape.

Figure 6A:
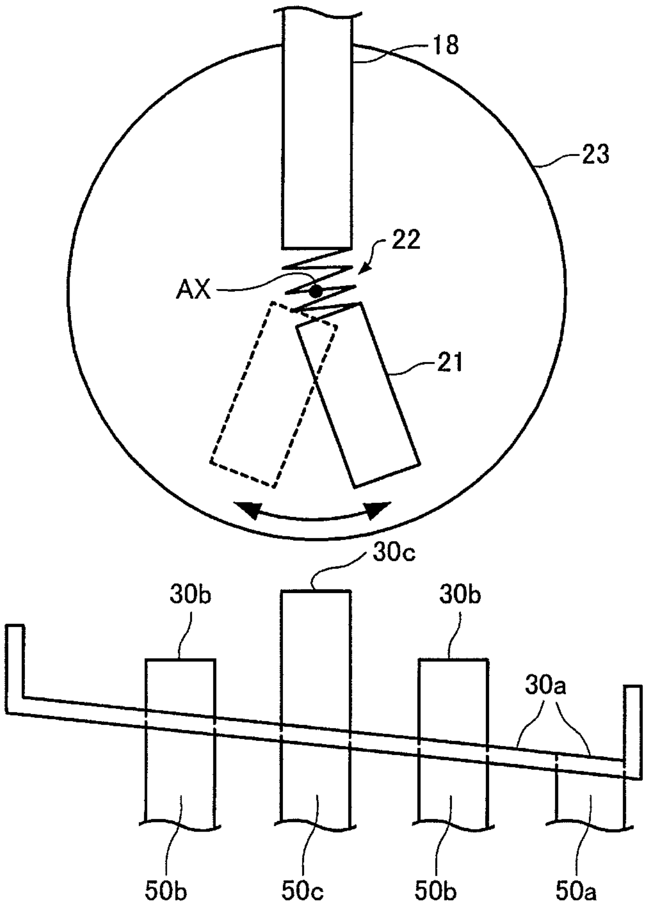
FIGS. 6A and 6B illustrate an example in which the position of an open area is changed.
Figure 6B:
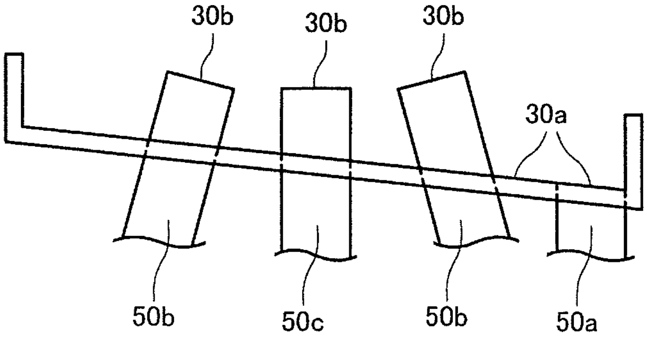

The position of the open area 30*b* or 30*c* may be changed by moving the moving path 50*b* or 50*c*. In the example illustrated in FIG. 6A, the position of the open area 30*b* is changed by moving the pipes that form the moving paths 50*b* in the direction (horizontal direction) away from the moving path 50*c*. The difficulty level for the player to cause the ball B to fall into the open area 30*b* or 30*c* (i.e., the difficulty level for the player to move the ball B to the second lottery section 40*b* or the third lottery section 40*c*) can be increased as compared with the case where the open areas 30*b* and 30*c* are positioned close to each other (see FIG. 2A) by thus increasing the distance between the open areas 30*b* and 30*c*. The difficulty level may be adjusted by changing the height (i.e., the position in the vertical direction) of the open area 30*b* or 30*c* by moving the moving path 50*b* or 50*c* in the vertical direction, or attaching an extension member to the upper part of the moving path 50*b* or 50*c*. As illustrated in FIG. 6B, the difficulty level for the player to cause the ball B to fall into the open area 30*b* may be adjusted by changing the position of the open area 30*b* by tilting the moving path 50*b* (i.e., forming the moving path 50*b* to be tiltable).

The game apparatus 10 according to one embodiment of the invention is configured so that the difficulty level can be adjusted by changing the speed and the moving amount of the distribution operation of the distribution section 20 (i.e., the operation of the swing pipe 21 that periodically swings).

Figure 7A:
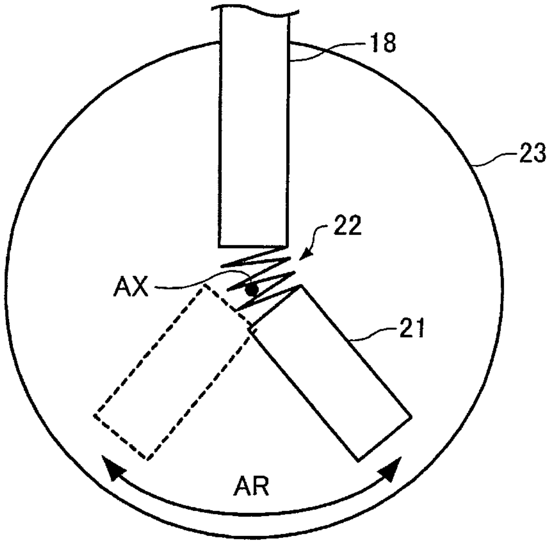
FIGS. 7A and 7B illustrate an example in which the moving amount of a distribution operation is changed.
Figure 7B:
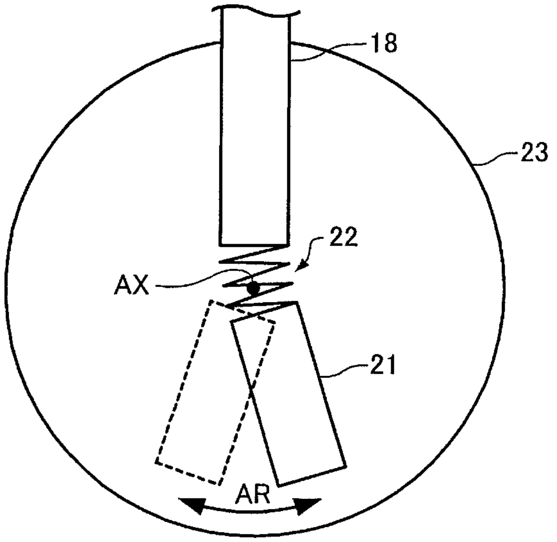

For example, the difficulty level for the player to cause the ball B to fall into the desired open area among the open areas 30*b* and 30*c* (i.e., the difficulty level for the player to move the ball B to the desired lottery section (second lottery section 40*b* or third lottery section 40*c*)) can be increased by increasing the angular range AR of the swing pipe 21 (rotary disk 23) that periodically rotates around the axis AX within a predetermined angular range (i.e., increasing the moving amount of the distribution operation) (see FIG. 7A). The difficulty level for the player to cause the ball B to fall into the desired open area can be decreased by decreasing the angular range AR of the swing pipe 21 (rotary disk 23) (i.e., decreasing the moving amount of the distribution operation) (see FIG. 7B).

The difficulty level for the player to cause the ball B to fall into the desired open area can be increased by increasing the angular velocity of the swing pipe 21 (rotary disk 23) that periodically rotates at a constant angular velocity (i.e., increasing the speed of the distribution operation), and can be decreased by decreasing the angular velocity of the swing pipe 21 (rotary disk 23) (i.e., decreasing the speed of the distribution operation).

2. Functional Blocks

Figure 8:
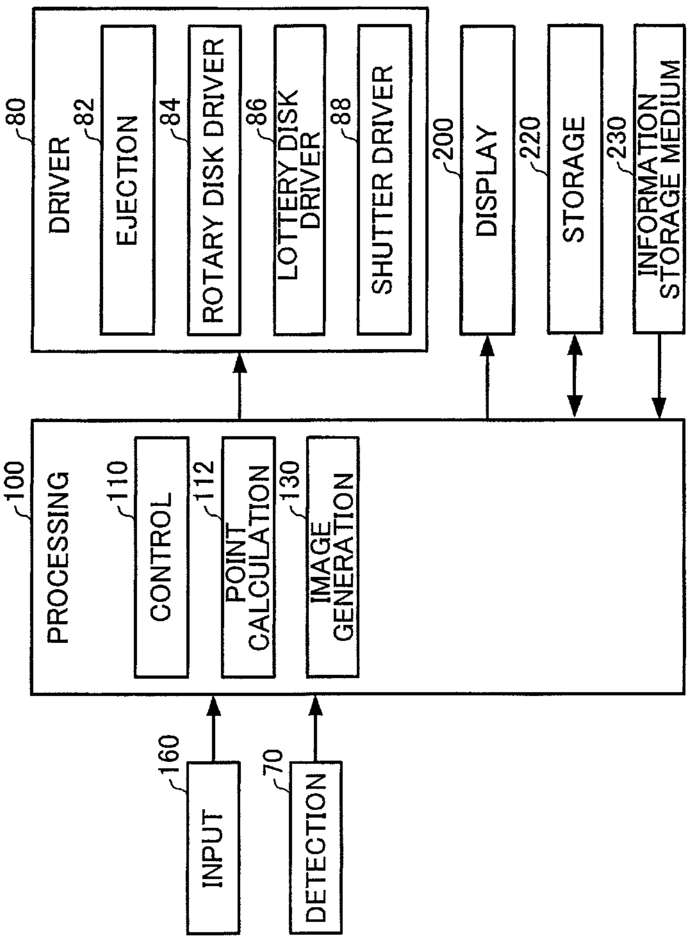
FIG. 8 is a functional block diagram illustrating an example of a game apparatus according to one embodiment of the invention.

FIG. 8 is a functional block diagram illustrating an example of the game apparatus 10 according to one embodiment of the invention. Note that the game apparatus 10 according to one embodiment of the invention may have a configuration in which some of the elements (sections) illustrated in FIG. 8 are omitted.

An input section 160 is a device that allows the player to input information, and outputs the information input by the player to a processing section 100. The function of the input section 160 may be implemented by the operation section 16 provided to the housing 12 (see FIG. 1). The input section 160 also has a function of detecting insertion of the game value (e.g., token), and outputting a detection signal to the processing section 100.

A detection section 70 is a sensor that is provided to each lottery section 40, and detects the ball B that has entered the lottery hole 42.

The processing section 100 (processor) includes a control section 110, a point calculation section 112, and an image generation section 130, and performs various processes such as a control process and an image generation process based on a signal output from the input section 160, the detection signal output from the detection section 70, a program, and the like. The function of the processing section 100 may be implemented by hardware such as a processor (e.g., CPU or DSP) or an ASIC (e.g., gate array), or a program (game program).

The control section 110 controls the operation of a driver section 80 based on a signal output from the input section 160, the detection signal output from the detection section 70, a program, and the like.

More specifically, the control section 110 outputs a control signal to a rotary disk driver section 84 and a lottery disk driver section 86 when insertion of the game value has been detected, the control signal causing the rotary disk driver section 84 to rotate the rotary disk 23 (swing pipe 21), and causing the lottery disk driver section 86 to rotate the lottery disk 43 of each lottery section 40. The control section 110 causes the rotary disk driver section 84 to periodically rotate the rotary disk 23 according to difficulty level information that specifies the angular velocity and the angular range AR (i.e., the speed and the moving amount of the distribution operation).

The control section 110 outputs a control signal to an ejection section 82 when it has been detected that the operation section 16 has been operated, the control signal causing the ejection section 82 to discharge the ball B. The control section 110 outputs a control signal to the ejection section 82 when it has been detected that the ball B has entered the predetermined lottery hole 42 of the second lottery section 40*b* to which a sign "3*b*" is assigned, the control signal causing the ejection section 82 to sequentially discharge three balls B.

The control section 110 outputs a control signal to a shutter driver section 88 when it has been detected that the ball B has entered the predetermined lottery hole 42 of the first lottery section 40*a* or the second lottery section 40*b* to which a sign "D" is assigned, the control signal causing the shutter driver section 88 to open the shutter 46 when the lottery hole 42 is positioned over the shutter 46. The control section 110 outputs a control signal to the shutter driver section 88 when it has been detected that the ball B has entered the lottery hole 42 of each lottery section other than the lottery hole 42 to which a sign "D" is assigned, the control signal causing the shutter driver section 88 to open the shutter 48 when the lottery hole 42 is positioned over the shutter 48.

The point calculation section 112 calculates points assigned (set) to the lottery hole 42 that has received the ball B when it has been detected that the ball B has entered the lottery hole 42 of each lottery section 40. Note that the lottery hole 42 that has received the ball B is determined based on the rotation angle of the lottery disk 43 of each lottery section 40 when the ball B has been detected by the detection section 70.

The image generation section 130 performs a drawing process based on the results of various processes performed by the processing section 100 to generate an image, and outputs the generated image to the display section 200. For example, the image generation section 130 generates a game image that indicates the points calculated by the point calculation section 112, and outputs the generated game image to the display section 200.

The driver section 80 includes the ejection section 82, the rotary disk driver section 84, the lottery disk driver section 86, and the shutter driver section 88. The ejection section 82 is provided inside the housing 12, and discharges the ball B into the distribution section 20 (game space 14) according to the control signal output from the control section 110. The rotary disk driver section 84 is a motor that rotates the rotary disk 23 (swing pipe 21) according to the control signal output from the control section 110. The lottery disk driver section 86 is a motor that is provided to each lottery section 40, and rotates the lottery disk 43 according to the control signal output from the control section 110. The shutter driver section 88 is a motor that is provided to each lottery section 40, and opens and closes the shutters 46 and 48 according to the control signal output from the control section 110.

The display section 200 outputs an image generated according to one embodiment of the invention. The function of the display section 200 may be implemented by a CRT, an LCD, or the like.

A storage section 220 serves as a work area for the processing section 100 and the like. The function of the storage section 220 may be implemented by hardware such as a RAM.

An information storage medium 230 (computer-readable storage medium) stores information (e.g., program and data). The function of the information storage medium 230 may be implemented by hardware such as a magnetic disk, a hard disk, a magnetic tape, a memory (ROM), a magneto-optical disk (MO), or an optical disk (CD or DVD). The processing section 100 performs various processes based on the information stored in the information storage medium 230. Specifically, a program that causes a computer to function as each section according to one embodiment of the invention (i.e., a program that causes a computer to execute the process performed by each section) may be stored in the information storage medium 230.

3. Modifications

The invention is not limited to the above embodiments. Various modifications and variations may be made of the above embodiments. Any term cited with a different term having a broader meaning or the same meaning at least once in the specification and the drawings may be replaced by the different term in any place in the specification and the drawings.

Although the above embodiments have been described taking an example in which the distribution section is implemented using the swing pipe, another configuration may also be employed. The distribution section may have an arbitrary configuration as long as the distribution section can periodically change the position at which the ball B is dropped.

Although the above embodiments have been described taking an example in which the game medium is discharged in response to an operation input performed by the player, and the discharged game medium passes through the discharge path section (swing pipe 21) that periodically swings, and falls into (or onto) the open area, another configuration may also be employed. For example, the discharge path section that periodically swings may be stopped in response to an operation input performed by the player, and the game medium discharged from the ejection section may pass through the stationary discharge path section, and fall into (or onto) the open area. Specifically, the periodical rotation (swing) of the swing pipe 21 (rotary disk) around the axis AX (see FIG. 2A) may be stopped when the player has operated the input section (operation section 16), and the ball B may then be discharged from the ejection section 82, and guided to the distribution section 20. In this case, the player enjoys the game by stopping the swing pipe 21 at the desired rotation angle, and discharging the ball B using the operation section 16 at an appropriate timing while observing the swing pipe 21 that periodically rotates so that the ball B falls into (or onto) the desired open area among the open areas 30*a*, 30*b*, and 30*c*.

Figure 9:
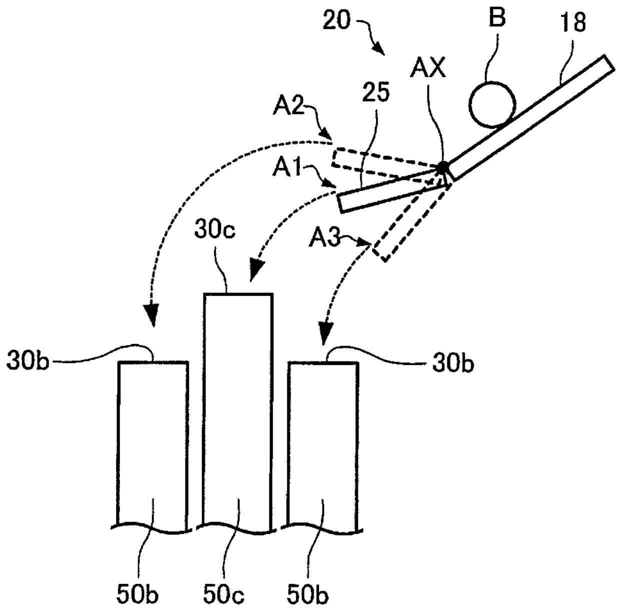
FIG. 9 illustrates a modification.

The discharge path section may operate to change the discharge position or the discharge direction of the game medium in response to an operation input performed by the player, and the ball B may then be discharged from the ejection section 82, and fall into (or onto) the open area through the discharge path section. In the example illustrated in FIG. 9, a discharge section 20 includes a discharge path section 25 along which the discharged ball B moves, and a driver section (not illustrated in FIG. 9) that rotates the discharge path section 25 around an axis AX to change the discharge position or the discharge direction of the game medium in response to an operation input performed by the player. The axis AX is provided at the end of the discharge path section 25 where the discharge path section 25 is connected to the moving path 18. The ball B that has been discharged from the ejection section is guided to the discharge path section 25 along the moving path 18, and falls into the open area 30*b* or 30*c* corresponding to the rotation angle (tilt angle) of the discharge path section 25. For example, when the rotation angle of the discharge path section 25 is A1, the ball B discharged from the discharge path section 25 falls into the open area 30*c*. When the rotation angle of the discharge path section 25 is A2 or A3, the ball B discharged from the discharge path section 25 falls into the open area 30*b*. The player enjoys the game by setting the discharge path section 25 at the desired rotation angle, and discharging the ball B using the operation section 16 so that the ball B falls into the desired open area among the open areas 30*b* and 30*c*.

Figure 10A:
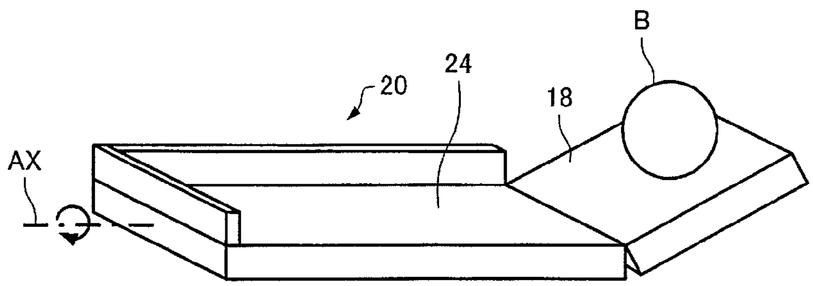
FIGS. 10A and 10B illustrate a modification.

The discharge path section may operate in response to an operation input performed by the player so that the game medium that moves along the discharge path section falls into the open area. In the example illustrated in FIGS. 10A and 10B, a discharge section 20 includes a discharge path section 24 along which the discharged ball B moves, and a driver section (not illustrated in FIGS. 10A and 10B) that rotates the discharge path section 24 around an axis AX that is parallel to the horizontal plane in response to an operation input performed by the player. The ball B that has been discharged from the ejection section is guided to the discharge path section 24 along the moving path 18, and falls into one open area among the open areas 30*a*, 30*b*, and 30*c* corresponding to the position of the ball B on the discharge path section 24 when the discharge path section 24 rotates. For example, when the discharge path section 24 has rotated in a state in which the ball B that moves along the discharge path section 24 is positioned over the open area 30*c*, the ball B falls into the open area 30*c*. When the discharge path section 24 has rotated in a state in which the ball B that moves along the discharge path section 24 is positioned over the open area 30*b*, the ball B falls into the open area 30*b*. In this case, the player enjoys the game by rotating the discharge path section 25 at an appropriate timing using the operation section 16 while observing the ball B that moves along the discharge path section 24 so that the ball B falls into the desired open area among the open areas 30*a*, 30*b*, and 30*c*.

Figure 10B:
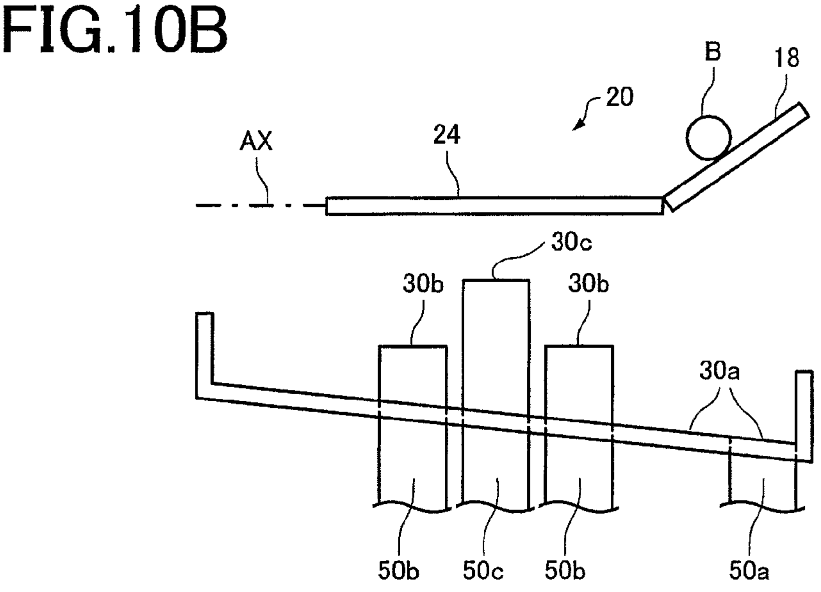

It is also possible to employ a configuration in which the discharge path section 24 is moved in the depth direction (i.e., the discharge path section 24 is withdrawn into the wall of the housing positioned on the rear side of the discharge path section 24) in response to an operation input performed by the player instead of rotating the discharge path section 24 so that the ball B that moves along the discharge path section 24 falls into the open area (see FIG. 10B).

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A lottery game apparatus that includes a first lottery section and a second lottery section that implement a lottery using a game medium, the lottery game apparatus comprising:

a discharge section that discharges the game medium based on an operation input performed by a player;

a first open area and a second open area that are provided under the discharge section, and receive the game medium that has fallen from the discharge section;

a first moving path that guides the game medium from the first open area to the first lottery section; and a second moving path that guides the game medium from the second open area to the second lottery section, the discharge section changing a discharge position or a discharge direction of the game medium.

2. The lottery game apparatus as defined in claim 1, wherein the discharge section includes:

a discharge path section, the game medium to be discharged passing through the discharge path section;

a driver section that periodically swings the discharge path section; and an ejection section that discharges the game medium toward the discharge path section, the ejection section discharging the game medium in response to an operation input performed by the player.

3. The lottery game apparatus as defined in claim 2, further comprising:

a third moving path that guides the game medium that has entered at least one lottery hole among a plurality of lottery holes formed in the first lottery section to the second lottery section.

4. The lottery game apparatus as defined in claim 2, wherein the first open area and the second open area differ in area.

5. The lottery game apparatus as defined in claim 2, wherein an area, a position, or a shape of at least one of the first open area and the second open area can be changed.

6. The lottery game apparatus as defined in claim 2, wherein at least one of a speed and a moving amount of an operation of the discharge path section that periodically swings can be changed.

7. The lottery game apparatus as defined in claim 1, wherein the discharge section includes:

a discharge path section, the game medium to be discharged passing through the discharge path section;

a driver section that periodically swings the discharge path section; and an ejection section that discharges the game medium toward the discharge path section, the driver section stopping the swing of the discharge path section, and the ejection section discharging the game medium in response to an operation input performed by the player.

8. The lottery game apparatus as defined in claim 7, further comprising:

a third moving path that guides the game medium that has entered at least one lottery hole among a plurality of lottery holes formed in the first lottery section to the second lottery section.

9. The lottery game apparatus as defined in claim 7, wherein the first open area and the second open area differ in area.

10. The lottery game apparatus as defined in claim 7, wherein an area, a position, or a shape of at least one of the first open area and the second open area can be changed.

11. The lottery game apparatus as defined in claim 7, wherein at least one of a speed and a moving amount of an operation of the discharge path section that periodically swings can be changed.

12. The lottery game apparatus as defined in claim 1, wherein the discharge section includes:

a discharge path section, the game medium to be discharged passing through the discharge path section;

a driver section that operates the discharge path section so that the game medium that moves along the discharge path section falls from the discharge path section; and an ejection section that discharges the game medium toward the discharge path section, the driver section operating the discharge path section in response to an operation input performed by the player to drop the game medium from the discharge path section.

13. The lottery game apparatus as defined in claim 12, further comprising:

a third moving path that guides the game medium that has entered at least one lottery hole among a plurality of lottery holes formed in the first lottery section to the second lottery section.

14. The lottery game apparatus as defined in claim 12, wherein the first open area and the second open area differ in area.

15. The lottery game apparatus as defined in claim 12, wherein an area, a position, or a shape of at least one of the first open area and the second open area can be changed.

16. The lottery game apparatus as defined in claim 1, further comprising:

a third moving path that guides the game medium that has entered at least one lottery hole among a plurality of lottery holes formed in the first lottery section to the second lottery section.

17. The lottery game apparatus as defined in claim 1, wherein the first open area and the second open area differ in area.

18. The lottery game apparatus as defined in claim 1, wherein an area, a position, or a shape of at least one of the first open area and the second open area can be changed.

* * * * *